United States Patent
Berris et al.

(10) Patent No.: US 7,199,078 B2
(45) Date of Patent: Apr. 3, 2007

(54) VEHICLE SULFUR OXIDE TRAP AND RELATED METHOD

(75) Inventors: Amy Berris, Royal Oak, MI (US); Jun Li, Canton, MI (US); Mohinder Singh Chattha, Northville, MI (US); William Lewis Henderson Watkins, Toledo, OH (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/275,686

(22) Filed: Jan. 24, 2006

(65) Prior Publication Data

US 2006/0105909 A1    May 18, 2006

Related U.S. Application Data

(60) Division of application No. 10/301,939, filed on Nov. 22, 2002, now Pat. No. 7,021,049, which is a continuation-in-part of application No. 09/675,836, filed on Sep. 29, 2000, now abandoned.

(51) Int. Cl.
*B01J 23/58* (2006.01)
*B01J 23/02* (2006.01)
*B01J 23/06* (2006.01)
*B01D 53/50* (2006.01)
*B01D 53/56* (2006.01)

(52) U.S. Cl. .............. 502/328; 502/340; 423/244.07; 423/213.2; 423/239.1

(58) Field of Classification Search .............. 502/400, 502/415, 517, 325, 328; 423/244.07
See application file for complete search history.

(56) References Cited

U.S. PATENT DOCUMENTS

| 4,323,544 | A | 4/1982 | Magder |
| 4,433,981 | A | 2/1984 | Slaugh et al. |
| 5,472,673 | A | 12/1995 | Goto et al. |
| 5,473,890 | A | 12/1995 | Takeshima et al. |
| 5,514,355 | A | 5/1996 | Eshita et al. |
| 5,687,565 | A | 11/1997 | Modica et al. |
| 5,758,489 | A | 6/1998 | Hepburn et al. |
| 5,850,735 | A | 12/1998 | Araki et al. |

(Continued)

OTHER PUBLICATIONS

Chalmers Applied Surface Chemistry, Chemical Engineering, Chalmers University of Technology, article entitled "Research Activities", from http://www.che.chalmers.se/inst/surfchem/research/env_cat.html, 3 pp., dated Aug. 10, 2000—now available at http://www.surfchem.chalmers.se/research/env_cat.html, with date of May 4, 1999.*

(Continued)

*Primary Examiner*—Colleen P. Cooke
(74) *Attorney, Agent, or Firm*—Brooks Kushman P.C.; Damian Porcari

(57) ABSTRACT

An automobile exhaust system includes a catalytic converter and a modified NOx trap wit improved sulfur tolerance. Sulfur oxide has a deleterious effect on the performance of nitrogen oxide traps. In the modified NOx trap, a sulfur oxide trap is integrated with a nitrogen oxide trap by coating the catalyst contained within a nitrogen oxide trap with a mixed oxide layer of calcium oxide and magnesium oxide. The NOx trap is regenerated by heating at elevated temperature for a short time period.

11 Claims, 3 Drawing Sheets

U.S. PATENT DOCUMENTS

| | | |
|---|---|---|
| 5,916,129 A | 6/1999 | Modica et al. |
| 6,025,297 A | 2/2000 | Ogura et al. |
| 6,048,821 A | 4/2000 | Demmel et al. |
| 6,074,984 A | 6/2000 | Demmel et al. |
| 6,207,612 B1 | 3/2001 | Reid et al. |
| 6,272,848 B1 | 8/2001 | Okude et al. |
| 6,318,075 B1 | 11/2001 | Gunther et al. |
| 6,338,831 B1 | 1/2002 | Strehlau et al. |
| 6,348,177 B1 | 2/2002 | Bartley et al. |
| 6,375,910 B1 | 4/2002 | Deeba et al. |
| 6,482,377 B2 | 11/2002 | Bartley et al. |
| 6,497,848 B1 | 12/2002 | Deeba et al. |
| 6,499,293 B1 | 12/2002 | Surnilla et al. |
| 6,537,511 B1 | 3/2003 | Chattha et al. |
| 6,863,874 B1 | 3/2005 | Twigg |
| 7,021,049 B2 * | 4/2006 | Berris et al. .................. 60/295 |
| 2002/0048542 A1 | 4/2002 | Deeba et al. |

OTHER PUBLICATIONS

Article entitled, "NOx Reduction", from http://www.people.virginia.edu/~davis/nox.html, 2 pp., dated Aug. 10, 2000.*

* cited by examiner

VEHICLE SULFUR OXIDE TRAP AND RELATED METHOD

CROSS-REFERENCE TO RELATED APPLICATIONS

This application is a division of U.S. Pat. No. 7,021,049, filed Nov. 22, 2002, which is a continuation-in-part of U.S. application Ser. No. 09/675,836, filed Sep. 29, 2000, now abandoned. The entire disclosures of each of these applications are hereby incorporated by reference.

BACKGROUND OF THE INVENTION

1. Field of the Invention

This invention relates to improving the operation of nitrogen oxide traps employed in the exhaust system of an internal lean burn combustion engine by adsorbing sulfur oxides.

2. Background Art

Environmental concerns have required automobile manufacturers to devise strategies for decreasing emission of unwanted combustion byproducts from a vehicles exhaust system. The three unwanted byproducts are carbon monoxide, nitrogen oxides, and hydrocarbons. The nitrogen oxides include both NO and $NO_2$. Three-way catalytic converters (TWC) are used to minimize emission of these byproducts.

When the engine is operated in a stoichiometric or slightly rich air/fuel ratio, i.e., between about 14.7 and 14.4, catalysts containing platinum, palladium, and rhodium or palladium and rhodium are able to efficiently convert all three gases simultaneously. It is desirable to operate an engine under lean burn conditions where the air/fuel ratio is greater that 14.7, generally between 19 and 27 to realize a benefit of fuel economy and reduced $CO_2$ emission. Such three-way catalysts are able to convert carbon monoxide and hydrocarbons but are not efficient in reduction of nitrogen oxides (NOx) during lean-burn operation. The situation is compounded by recent EPA guidelines that require even lower emissions of nitrogen oxides. Such stringent requirements regarding nitrogen oxide have made it desirable to include an additional nitrogen oxide trap in addition to the standard TWC.

The decomposition of NO and $NO_2$ into $N_2$ and $O_2$ is thermodynamically favorable but kinetically inhibited. Therefore, NOx traps will typically contain a catalyst such as platinum. Such traps are believed to first oxidize adsorbed NO to $NO_2$ wherein the $NO_2$ subsequently forms a nitrate with another component of the trap such as barium. Subsequently, during regeneration periods when the engine is operated in an stoichiometric or fuel rich condition, these nitrates are thermodynamically unstable resulting in the release of various NOx species. These released NOx catalytically react with reducing species in the exhaust such as hydrocarbons, CO and $H_2$ over the catalyst to form $N_2$.

However, a serious drawback in the operation of NOx traps is that they are readily poisoned by sulfur contained in the vehicle exhaust gas. Most vehicle fuels contain sulfur which is subsequently converted to various sulfur oxides such as $SO_2$ when the fuel is combusted. These sulfur oxides react with the NOx trap materials to form sulfates. Sulfates are not as readily converted back to the sorption materials during regeneration as are the nitrates. Therefore, the typical NOx trap is strongly deactivated over time by the sulfur compounds contained in the exhaust.

SUMMARY OF THE INVENTION

It is an object of the present invention to provide an improved sulfur oxide trap useful for decreasing sulfur poisoning of nitrogen oxide traps.

It is another object of the present invention to provide an improved sulfur oxide trap that can be desulfated during stoichiometric or fuel rich engine operation.

It is another object of the present invention to provide an improved method of improving the tolerance of a nitrogen oxide trap to sulfur oxide.

The present invention discloses a sulfur oxide trap that may be used to improve efficiency of a nitrogen oxide trap by increasing the nitrogen oxide trap's apparent sulfur tolerance. It will be understood that a sulfur oxide trap captures not only sulfur oxides, but also other gaseous sulfur species such as $H_2S$. Sulfur oxide has a deleterious Therefore, by removing sulfur species from an exhaust gas before they reach the nitrogen oxide trap, the efficiency of the NOx trap remains higher for a longer period of time. The sulfur oxide trap of the present invention, comprises a monolithic substrate such as cordierite which is over-coated with an aluminum oxide layer which in turn is over-coated with a mixed oxide layer that includes calcium oxide and magnesium oxide. The sulfur oxide trap of the present method is capable of being desulfated and thereby regenerated by heating to an elevated temperature under stoichiometric or fuel rich conditions over a short period of time.

In accordance with yet another aspect of the invention, a method for preparing a sulfur oxide trap useful for improving the sulfur tolerance of a NOx trap is provided. In this embodiment, a monolithic substrate is first coated with an aluminum oxide slurry. The coated substrate is then dried at a sufficient temperature so that the coating is dried within several hours. The dried aluminum oxide coated substrate is then heat treated at a higher temperature sufficient to ensure that an aluminum oxide layer is securely fixed to the substrate. A mixed oxide slurry comprising calcium oxide and magnesium oxide is applied to the substrate. This second coating is then dried at a sufficient temperature so that the coating is dried within several hours. The preparation of the sulfur oxide trap is completed by heating the coated substrate to a higher temperature sufficient to ensure that a mixed oxide layer is securely fixed to the substrate.

In accordance with yet another aspect of the invention, a method for preparing a sulfur oxide trap useful for improving the sulfur tolerance of a NOx trap is provided. In this embodiment, a monolithic substrate is first coated with a solution containing a water soluble aluminum compound. The coated substrate is then dried at a sufficient temperature so that the coating is dried within several hours. The dried coated substrate is then heat treated at a higher temperature sufficient to ensure that an aluminum oxide layer is securely fixed to the substrate. A solution containing both a water soluble calcium compound and a water soluble magnesium compound is applied to the substrate. This second coating is then dried at a sufficient temperature so that the coating is dried within several hours. The preparation of the sulfur oxide trap is completed by heating the coated substrate to a higher temperature sufficient to ensure that a mixed oxide layer is securely fixed to the substrate.

In accordance with still another aspect of the invention, a method for modifying a NOx trap is provided. A solution containing both a water soluble calcium compound and a water soluble magnesium compound is applied to a NOx trap. The coated trap is then dried at a sufficient temperature so that the coating is dried within several hours. The coated trap is then heat treated at a higher temperature sufficient to ensure that a mixed oxide layer is securely fixed to the NOx trap. The amount of solution with which the nitrogen oxide trap is coated is such that the resulting mixed calcium oxide/magnesium oxide coating on the catalyst is approximately 2 percent of the weight of the trap. This amount of coating does not completely cover the nitrogen oxide trap and still allows the trap to function as designed. A nitrogen oxide trap that has been modified by this embodiment is capable of being desulfated by heating at an elevated temperature under stoichiometric or rich conditions over a short period of time.

DETAILED DESCRIPTION OF THE PREFERRED EMBODIMENT(S)

Figure 1:
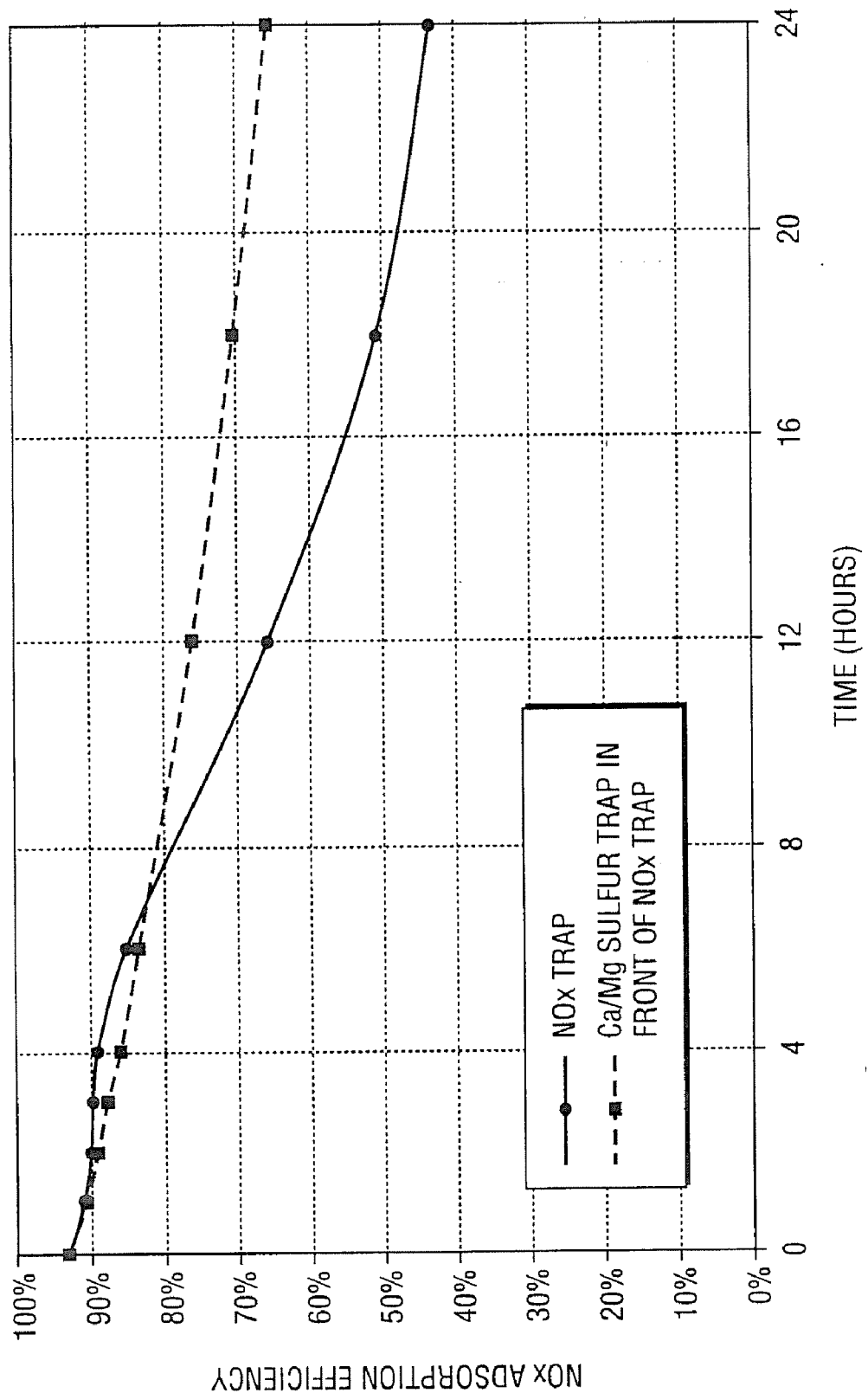
FIG. 1 is a graph that compares the NOx removal efficiency of a NOx trap with the sulfur oxide trap of the present invention positioned upstream of the NOx trap versus a NOx trap without such a sulfur oxide trap upstream.

Reference will now be made in detail to presently preferred embodiments and methods of the invention, which constitute the best modes of practicing the invention presently known to the inventor.

In accordance with one embodiment of the invention, a presently preferred sulfur oxide trap capable of improving the function of a nitrogen oxide trap is provided. The sulfur oxide trap of the present invention, comprises a monolithic substrate such as cordierite which is over-coated with an aluminum oxide layer which is in turn is over-coated with a mixed oxide layer that includes calcium oxide and magnesium oxide. It has been surprisingly found that this mixed oxide combination renders the sulfur oxide trap to be regenerable under stoichiometric or fuel rich conditions when the sulfur oxide trap is placed downstream of a catalytic converter. Accordingly, the present invention also provides an internal combustion engine system (i.e., an exhaust system) which includes a catalytic converter and the sulfur trap of the present invention. Typically, such a catalytic converter is a three-way catalyst. Specifically, when an internal combustion engine is operated for short periods of time under stoichiometric or fuel rich conditions the temperature of the sulfur oxide trap increases. The temperature rise is caused by an increase in exothermic reactions occurring in the catalytic converter. More preferably, the sulfur oxide trap is regenerable under fuel rich conditions. This temperature increase is found to regenerate (i.e., desulfate) the sulfur oxide trap of the present invention and to improve sulfur oxide trapping efficiency when the internal combustion engine is subsequently operated under normal conditions (i.e., lean fuel conditions). Preferably, when regeneration is desired, the engine is operated under stoichiometric or fuel rich condition for a sufficient amount of time so that the sulfur oxide trap achieves a temperature of at least 450° C. More preferably, the engine is operated for a sufficient period of time so that the trap reaches a temperature of at least 500° C.; and, most preferably, the engine is operated for a sufficient period of time so that the trap reaches a temperature of at least 600° C. Typically, if the regeneration is carried out at 400° C., the time needed for regeneration will be about 15 minutes, at 500° C. about 10 minutes, and at 600° C. about 2 minutes. The preferred mixed oxide layer has about 20% to 80% calcium oxide by weight and about 20% to 80% magnesium oxide by weight. More preferably, the mixed oxide layer has about 30% to 70% calcium oxide by weight and about 30% to 70% magnesium oxide by weight. In a particularly preferred embodiment of the present invention, the mixed oxide layer has about 50% calcium oxide by weight and about 50% magnesium oxide by weight. In another particularly preferred embodiment of the present invention, the mixed oxide layer has about 40% calcium oxide by weight and about 60% magnesium oxide by weight. The preferred weight ratio of calcium oxide to magnesium oxide is about 0.25 to about 4 and, more preferably, about 0.43 to about 2.3. In a particularly preferred embodiment of the present invention, the weight ratio of calcium oxide to magnesium oxide is about 1. In another particularly preferred embodiment of the present invention, the weight ratio of calcium oxide to magnesium oxide is about 0.67. The combined weight of the aluminum oxide layer and the mixed oxide layer will preferably be about 10% to 50% of the weight of the sulfur oxide trap and, more preferably, about 20% to 30% of the weight of the sulfur oxide trap with the weight of the mixed oxide layer being about 2% to 20% of the combined weight of the aluminum oxide and mixed oxide layers.

In accordance with another embodiment of the invention, a presently preferred method of preparing a sulfur oxide trap capable of improving the function of a nitrogen oxide trap is provided. In this preferred embodiment, the sulfur oxide trap is fabricated by coating a monolithic substrate with an aluminum oxide slurry. The aluminum oxide slurry is preferably 0% to 50% by weight aluminum oxide with the balance being water. The monolithic substrate is preferably made of a refractory material such a cordierite. The coated substrate is next dried at an elevated temperature. Drying at 80° C. for approximately 6 hours has been found to be satisfactory. The resulting dried aluminum oxide coating substrate is then coated with a mixed oxide slurry of calcium oxide and magnesium oxide. The mixed oxide slurry will preferably contain 0% to 50% calcium oxide and 0% to 50% magnesium oxide with the balance being water. This second coating is then dried at an elevated temperature of about 80° C. for approximately 6 hours. The preparation of the sulfur oxide trap is completed by heating the coated substrate to a higher temperature of about 600° C. for approximately 6 hours. The combined weight of the aluminum oxide layer and the mixed oxide layer will preferably be about 10% to 50% of the weight of the sulfur oxide trap and, more preferably, about 20% to 30% of the weight of the sulfur oxide trap with the weight of the mixed oxide layer being about 2% to 20% of the combined weight of the aluminum oxide and mixed oxide layers. The sulfur oxide trap made by this method is regenerable as set forth above.

In accordance with yet another embodiment of the invention, a method for preparing a sulfur oxide trap useful for improving the sulfur tolerance of a NOx trap is provided. In this embodiment, a monolithic substrate is first coated with a solution containing a water soluble aluminum compound such as aluminum nitrate, aluminum chloride, and aluminum hydroxide. The coated substrate is then dried at about 80° C. for approximately 6 hours. The dried coated substrate is then heat treated at a higher temperature of approximately 600° C. for approximately 6 hours. A solution containing both a water soluble calcium compound and a water soluble magnesium compound is applied to the substrate. Preferred water soluble calcium compounds include calcium nitrate and calcium chloride. Preferred water soluble magnesium compounds include magnesium nitrate and magnesium chloride. This second coating is then dried at an elevated temperature of about 80° C. for approximately 6 hours. The preparation of the sulfur oxide trap is completed by heating the coated substrate to a higher temperature of about 600° C. for approximately 6 hours. The combined weight of the aluminum oxide layer and the mixed oxide layer will preferably be about 10% to 50% of the weight of the monolithic substrate and, more preferably, about 20% to 30% of the weight of the monolithic substrate with the weight of the mixed oxide layer being about 2% to 20% of the combined weight of the aluminum oxide and mixed oxide layers. The sulfur oxide trap made by this method is regenerable as set forth above.

In accordance with still another embodiment of the invention, a method for modifying a NOx trap is provided. A solution containing both a water soluble calcium compound and a water soluble magnesium compound is applied to a NOx trap. Preferred water soluble calcium compounds include calcium nitrate and calcium chloride. Preferred water soluble magnesium compounds include magnesium nitrate and magnesium chloride. The NOx trap will typically contain platinum, palladium, or rhodium as a precious metal and barium oxide as the trapping element. The coated trap is then dried for 6 hours at 80° C and then heat treated (calcined) at 600° for 6 hours. The amount of solution with which the nitrogen oxide trap catalyst is coated is such that the resulting mixed calcium oxide/magnesium oxide coating on the catalyst is approximately 2 percent of the weight of the trap. This amount of coating does not completely cover the nitrogen oxide trap catalyst and still allows the trap to function at its designed NOx trapping efficiency. A nitrogen oxide trap that has been modified by this embodiment is capable of being desulfated (i.e., regenerated) under stoichiometric or fuel rich conditions when the modified nitrogen oxide trap is placed downstream of a catalytic converter. Typically, such a catalytic convener is a three-way catalyst. Specifically, when an internal combustion engine is operated for short periods of time under stoichiometric or fuel rich conditions, the temperature of the modified nitrogen oxide trap increases. The temperature rise is caused by an increase in exothermic reactions occurring in the catalytic convener. More preferably, the modified NOx trap is regenerable under fuel rich conditions. This temperature increase is found to regenerate the modified nitrogen oxide trap of the present invention and to improve sulfur oxide trapping efficiency when the internal combustion engine is subsequently operated under normal conditions (i.e., lean fuel conditions). Preferably, when regeneration is desired, the engine is operated under stoichiometric or fuel rich condition for a sufficient amount of time so that the modified NOx trap achieves a temperature of at least 450° C. More preferably, the engine is operated for a sufficient period of time so that the trap reaches a temperature of at least 500° C.; and, most preferably, the engine is operated for a sufficient period of time so that the trap reaches a temperature of at least 600° C. Typically, if the regeneration is carried out at 400° C., the time needed for regeneration will be about 15 minutes, at 500° C. about 10 minutes, and at 600° C. about 2 minutes.

An internal combustion engine system which includes the sulfur oxide trap of the present invention may also include another catalytic device such as a catalytic converter employing a conventional three-way catalyst containing palladium, etc. The three-way converter may be placed upstream of the sulfur oxide trap or the modified NOx trap set forth above (NOx/sulfur oxide trap combination). In either configuration, the three-way catalyst being closer to the engine would warm up quickly and provide for efficient engine cold start emission control. When an unmodified NOx trap is used, the sulfur trap of the present invention will be upstream of the NOx trap. Once the engine is warmed up, the three-way catalyst will remove the majority of hydrocarbons, carbon monoxide, and nitrogen oxides during stoichiometric operation and hydrocarbons and carbon monoxide during lean operation. The NOx trap is positioned downstream of the three-way catalyst at a position where exhaust temperature allows for optimal efficiency of NOx trap. The sulfur oxide trap is periodically regenerated by short periods or intervals of stoichiometric or, more preferably, slightly rich engine operation. During such period of operation, the sulfur oxide trap will achieve a sufficiently high temperature for regeneration.

The present invention has particular utility when used with lean-burn engines. Lean burn engines are those which at least during part of their operation operate with air/fuel ratios containing excess oxygen relative to a stoichiometric ratio. For gasoline engines, that range is usually 19–27; and for diesel engines, the range is usually 19–40 or more.

EXAMPLE 1

An aluminum oxide slurry is prepared by mixing 100 grams of gamma aluminum oxide with 100 grams of water. Similarly, a mixed calcium and magnesium oxide slurry is prepared by mixing 10 grams of calcium oxide, 10 grams magnesium oxide and 100 grams of water. The calcium oxide slurry and the magnesium oxide slurry are combined together in a 1 to 1 proportion so that a mixed oxide slurry is produced. A monolithic substrate is coated with the aluminum oxide slurry and then heated to 80° C. for 6 hours. The resulting coated substrate is then calcined by heating at a temperature of 600° C. for 6 hours. Calcination is the process by which a material is heated to a high temperature such that hydrates, carbonates or other materials can be removed. The resulting coated substrate is next coated with the mixed oxide slurry and then heated to 80° C. for 6 hours. The resulting coated substrate is then calcined by heating at a temperature of 600° C. for 6 hours.

EXAMPLE 2

An aluminum nitrate solution is prepared by mixing 200 grams of aluminum nitrate and 100 grams of water. A mixed nitrate solution of calcium nitrate and magnesium nitrate is prepared by mixing 10 grams of calcium nitrate, 10 grams magnesium nitrate and 100 grams of water. A monolithic substrate is coated with the aluminum nitrate solution and then heated to 80° C. for 6 hours. The resulting coated substrate is then calcined by heating at a temperature of 600° C. for 6 hours. The resulting coated substrate is next coated with the mixed nitrate solution and then heated at 80° C. for 6 hours. The resulting coated substrate is then calcined by heating at a temperature of 600° C. for 6 hours.

FIG. 1 shows the results of tests assessing the NOx removal efficiency of a NOx trap with the sulfur oxide trap made in Example 2 positioned upstream of the NOx trap versus a NOx trap without such a sulfur oxide trap. In this experiment, alternating lean and rich gas mixtures were flowed in separate tests through the NOx trap and through a tandem combination of the sulfur oxide trap of the present invention and a NOx trap. These gases were cycled back and forth every minute. The lean mixture was 9 ppm $SO_2$, 518 ppm NO, 10% $CO_2$, 10% $H_2O$, and 6% $O_2$. The rich mixture was 9 ppm $SO_2$, 518 ppm NO, 10% $CO_2$, 10% $H_2O$, 1.2% CO and 0.4% $H_2$. FIG. 1 shows that the performance for sulfur oxide trap/NOx trap configuration and a NOx trap without the sulfur oxide trap are essentially equivalent for times less than 8 hours. However, for all times beyond 8 hours of testing, the performance of the sulfur oxide trap/NOx trap configuration was superior in removing NOx.

EXAMPLE 3

A solution of calcium nitrate and magnesium nitrate is prepared by mixing 10 grams of calcium nitrate, 10 grams magnesium nitrate and 100 grams of water. A nitrogen oxide trap is coated with the mixed nitrate solution. The coated trap is then dried for 6 hours at 80° C. and then heat treated (calcined) at 600° C. for 6 hours. The amount of solution with which the nitrogen oxide trap catalyst is coated is such that the resulting mixed calcium oxide/magnesium oxide coating on the catalyst is approximately 2 percent of the weight of the catalyst. This amount of coating does not completely cover the nitrogen oxide trap catalyst and still allows the trap to function as designed.

Figure 2:
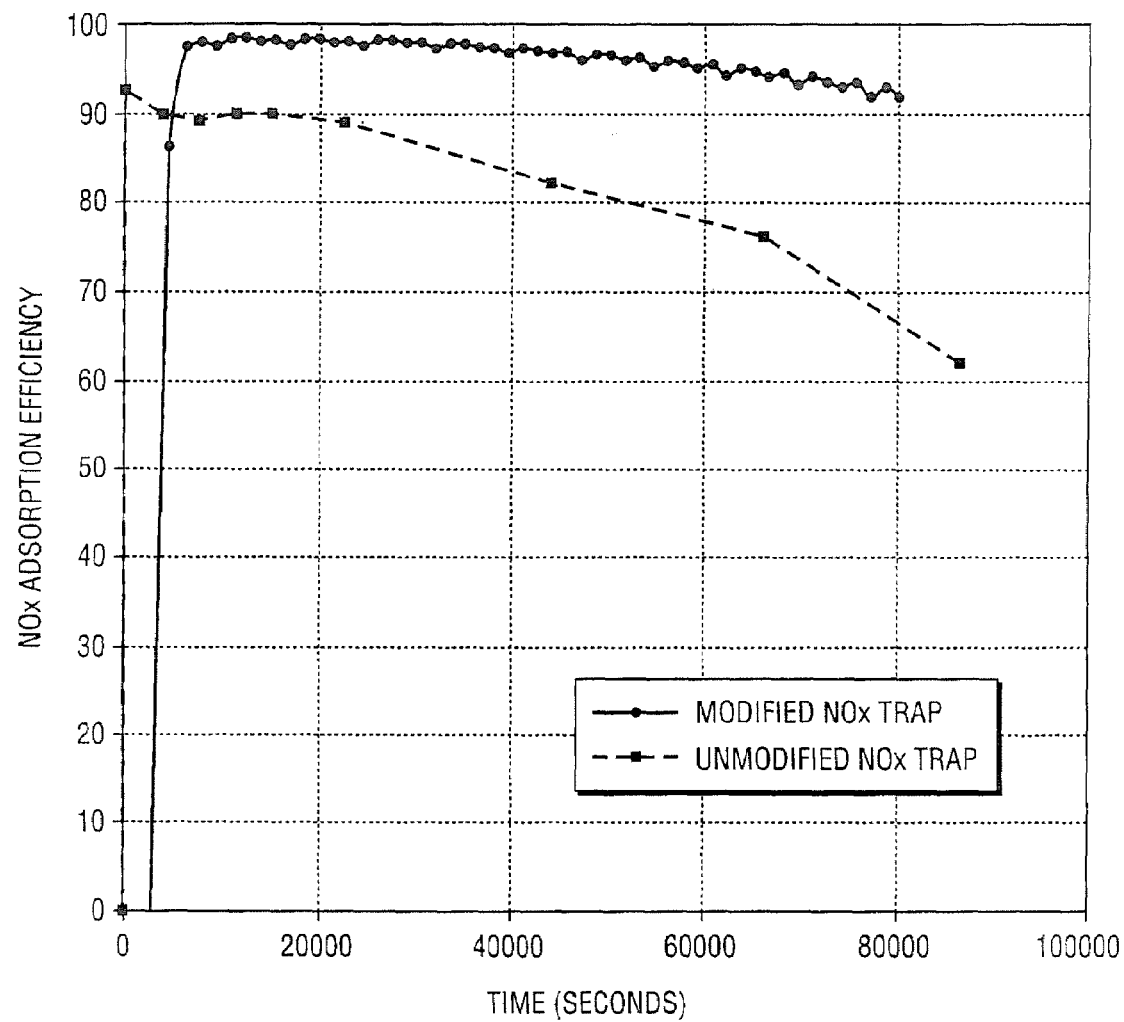
FIG. 2 is a graph that compares the NOx removal efficiency of a NOx trap which is modified by the present invention versus an unmodified NOx trap.

FIG. 2 shows the results of tests assessing the NOx removal efficiency of a NOx trap which is modified by the present invention versus an unmodified NOx trap. In this experiment, alternating lean and rich gas mixtures were flowed in separate tests through the modified NOx trap and the unmodified NOx trap. These gases were cycled back and forth every minute. The lean mixture was 9 ppm $SO_2$, 518 ppm NO, 10% $CO_2$, 10% $H_2O$, and 6% $O_2$. The rich mixture was 9 ppm $SO_2$, 518 ppm NO, 10% $CO_2$, 10% $H_2O$, 1.2% CO and 0.4% $H_2$. It can be seen from FIG. 2 that for all times over a 24 hour test period the performance of the modified trap in removing NOx was superior when compared to an unmodified trap.

Figure 3:
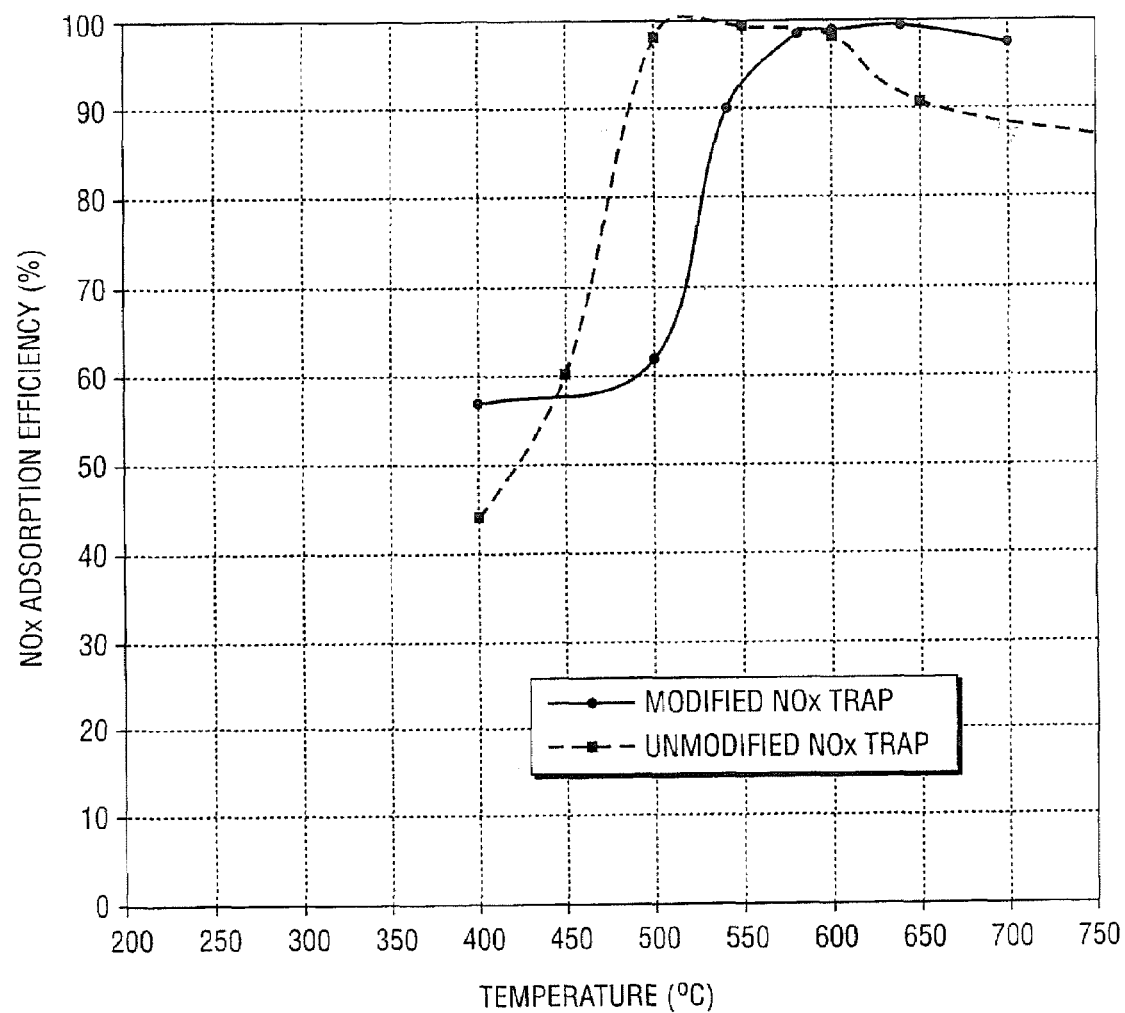
FIG. 3 is a graph that compares the regeneration characteristics of a modified NOx trap versus an unmodified trap.

FIG. 3 shows the results of an experiment that demonstrates the improvement in the regeneration characteristics of a modified NOx trap versus an unmodified trap. In this experiment, the modified and unmodified NOx traps had been saturated with $SO_2$ by flowing a lean gaseous mixture of 9 ppm $SO_2$, 518 ppm NO, 10% $CO_2$, 10% $H_2O$, and 6% $O_2$ through the traps for 68 hours. The trap is regenerated by flowing a rich mixture until the temperature indicated on the x-axis of FIG. 3 is achieved, at that point, the temperature is maintained for 30 minutes. The rich composition was 518 ppm NO, 10% $CO_2$, 10% $H_2O$, 1.2% CO and 0.4% $H_2$. The temperature is then allowed to drop to 350° C. and NOx adsorption efficiency evaluated by flowing a composition consisting of alternating lean and rich gas composition through the modified NOx trap. These gases were cycled back and forth every minute. The lean composition was 518 ppm NO, 10% $CO_2$, 10% $H_2O$, and 6% $O_2$. The rich composition was 518 ppm NO, 10% $CO_2$, 10% $H_2O$, 1.2% CO and 0.4% $H_2$. Even though the modified NOx trap requires a higher temperature for complete regeneration, it can be seen from FIG. 3 that the modified NOx trap achieves a higher and more uniform efficiency for NOx removal than the unmodified trap. Furthermore, the modified NOx trap does not require as frequent regeneration as the unmodified NOx trap because the sulfur tolerance has been significantly improved.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method of increasing the sulfur tolerance of a nitrogen oxide trap, the method comprising:
   a) preparing a mixed oxide solution containing a water soluble calcium compound and a water soluble magnesium compound;
   b) coating said nitrogen a sulfur oxide trap with the mixed oxide solution to form a coated nitrogen oxide trap;
   c) drying the coated nitrogen oxide trap at a first elevated temperature; and
   d) heat treating the coated nitrogen oxide trap at a second elevated temperature to form a modified NOx trap overcoated with a mixed oxide layer wherein the second elevated temperature is higher than the first elevated temperature and the mixed oxide layer does not completely cover the NOx trap;
   wherein the modified NOx trap when placed downstream of a catalytic convener in an exhaust system of an internal combustion engine, the modified NOx trap is regenerable by operating the internal combustion engine system under stoichiometric or rich fuel conditions for a sufficient time that the modified NOx oxide trap achieves a temperature of at least 450° C.

2. The method of claim 1, wherein the water soluble calcium compound is calcium nitrate and the water soluble magnesium compound is magnesium nitrate.

3. The method of claim 1, wherein the nitrogen oxide trap is coated with an amount of mixed nitrate solution that does not significantly decrease the ability of the nitrogen oxide trap to trap nitrogen oxide.

4. The method of claim 1, wherein the modified NOx trap is desulfated by exposing the trap to the exhaust of an internal combustion engine system operating at stoichiometric or fuel rich conditions.

5. The method of claim 4, wherein the modified NOx trap is heated to an elevated temperature.

6. A modified NOx trap comprising:
   a NOx trap; and
   a mixed oxide layer deposited on the NOx trap wherein the mixed oxide layer does not completely cover the NOx trap;
   wherein the modified NOx trap when placed downstream of a catalytic converter is regenerable by operating under stoichiometric or rich fuel conditions for a sufficient time that the modified NOx trap achieves a temperature of at least 450° C.

7. The modified NOx trap of claim 6 wherein the mixed oxide layer does not completely cover the NOx trap.

8. The modified NOx trap of claim 6 wherein the mixed oxide layer comprises calcium oxide and magnesium oxide.

9. The modified NOx trap of claim 6 wherein the NOx trap comprises a precious metal selected from the group consisting of platinum, palladium, and rhodium.

10. The modified NOx trap of claim 6 wherein the NOx trap comprises barium oxide.

11. The modified NOx trap of claim 6 wherein the modified NOx trap is desulfated by exposing the trap to the exhaust of an internal combustion engine system operating at fuel rich condition.

* * * * *